United States Patent Office 3,339,233
Patented Sept. 5, 1967

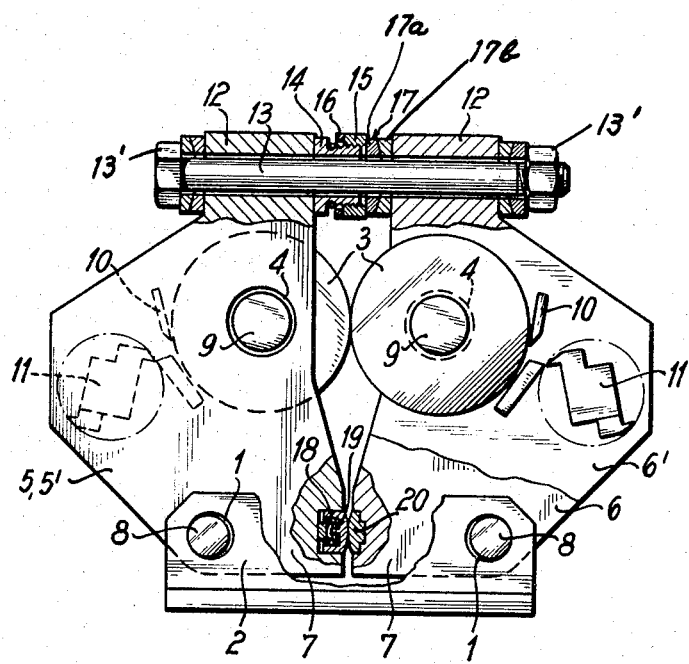
INVENTORS
HEINZ WOITZEL
HEINZ KOCH

3,339,233
GRANULATING DEVICE
Heinz Woitzel, Stuttgart-Feuerbach, and Heinz Koch, Ludwigsburg, Germany, assignors to Werner & Pfleiderer, Stuttgart-Feuerbach, Germany, a firm of Germany
Filed July 30, 1965, Ser. No. 475,981
Claims priority, application Germany, Aug. 17, 1964, W 37,387
4 Claims. (Cl. 18—9)

The present invention relates to a device for granulating plastic materials, such as resins and other synthetic plastic materials, and more particularly, to a granulating device in which the material to be granulated is worked between grooved rollers as shown for instance in Patent No. 3,140,511.

There are known granulating devices of the kind above referred to in which the trunnions or pivot lugs of each of the rollers are journalled in bearing members. Each of these bearing members is slidably guided in a frame structure comprised of a lower or base part and an upper, generally yoke-shaped part. The mounting members for one of the rollers abut against a bally portion on one narrow side of the frame structure and the mounting members for the other roller are adjustable on the opposite narrow side of the frame structure by means of a spindle threaded into a nut or threaded sleeve. The operational setting of the rollers in reference to each other and the separation of the rollers are effected by means of these spindles. With granulating devices of this kind, it is necessary to make the cross sectional strength of the frame structure very high, or to pre-stress the mounting members very strongly by means of the spindles to avoid spreading of the frame structure by the operational load. Such powerful stressing of the mounting members tends to cause breaking of the bearing lugs or trunnions of the rollers or damage to the bearings themselves. Damage of this kind may also be caused solely by the need to compensate for the play between the facing surfaces of the upper and lower parts of the frame structure and also for the play in the bearings for the spindles. Each compensation of the play must be effected by a very strong pre-stressing of the components involved. As a result, the bearings for the rollers are subjected to heavy loads even before the application of the operational load which manifests itself in the form of a wedge-like action of the strands formed by the rollers out of the material to be treaded. The aforedescribed tensioning or pre-stressing also causes an increased load demand at the drive means.

After each disassembly of the rollers, the same must be carefully reset and the pre-stressing of the respective components must be painstakingly checked. This is a time consuming and, hence, expensive operation, the more so as the components to be inspected and serviced are not readily accessible.

To sum up, granulating devices as heretofore known are expensive to manufacture and to operate and they are not very reliable.

It is a broad object of the present invention to provide a novel and improved granulating device of the general kind above referred to which is substantially free of the above pointed out shortcomings of the conventional granulating devices.

A more specific object of the invention is to provide a novel and improved granulating device in which the lengths of all parts subjected to pre-stressing or pre-tensioning are comparatively short, thereby correspondingly reducing the danger of damage to these parts.

Another more specific object of the invention is to provide a novel and improved granulating device in which the load at the bearings for the extruder screws is substantially limited to the operational load only.

Still another more specific object of the invention is to provide a novel and improved granulating device in which, after disassembly and reassembly, the same operational setting is automatically obtained without requiring readjustment.

A further more specific object of the invention is to provide a novel and improved granulating device which can be thoroughly and conveniently cleaned by simply tilting outwardly the mounting members for the rollers.

A still further object of the invention is to provide a novel and improved granulating device in which the operational spreading of the device can be accurately and conveniently controlled in accordance with the properties of the specific material to be worked and with the heating or cooling applied to the rollers, by selecting appropriate cross sections and materials for the tensioning means of the device. As a result, the rollers always remain in the optimal position with reference to each other.

Another object of the invention, allied with the next preceding one, is to provide a novel and improved granulating device in which the tensioning means are accurately and conveniently adjustable whereby the positions of the mounting members and of the rollers can be determined within very narrow limits.

Yet another object of the invention is to provide a novel and improved extruder device in which any play in the bearings for the mounting members is eliminated by spring tension, at least when the device is set up for operation. This has the advantage that the rollers need not be pressed toward each other to eliminate any play in the bearings therefor.

It is also an object of the invention to provide a novel and improved granulating device in which a cutting means for chopping the strands formed by the rollers out of the material to be worked is mounted on the mounting member for each roller so that the position of each cutting means in reference to the respective roller remains unchanged. In addition, a stripping or separating means for stripping the strands of material from the rollers may also be mounted on each mounting member.

Other and further objects, features and advantages of the invention will be pointed out hereinafter and set forth in the appended claims constituting part of the application.

In the single figure of the accompanying drawing, a diagrammatic cross sectional view of the device is shown by way of illustration and not by way of limitation.

The granulating device as exemplified comprises a frame structure 2 at each end of twin forming rollers 3, which may have parallel grooves along the length of the rollers as is shown in FIG. 2 of Patent 3,140,511, and should be visualized as being generally conventional. Only one of the frame structures is illustrated. The other frame structure and the components associated therewith should be visualized as being similarly constructed. The two frame structures may be joined by suitable cross bars, or they may have a common base plate.

The base part of the illustrated frame structure 2 includes two bearings 1 in which the lower ends 7 of comparatively rigid, generally jaw-shaped, mounting members 5 and 6 are pivotally supported by means of pivot pins or lugs 8. The provision of mounting members at the other end of rollers 3 is indicated by reference numerals 5' and 6'. Each of the mounting members includes a bearing 4 in which a journal or pivot lug 9 at the respective end of roller 3 is rotatably supported.

The two rollers 3 should be visualized as being suitably rotated in reference to each other. The drive means for the rollers are not illustrated or further described, since they do not constitute part of the invention.

Each of the jaws mounts a stripping device diagrammatically indicated at 10 for stripping the strands of material forming in the grooves of the rollers as the same are operated (see Patent 3,140,511). Each of the mounting members further supports a cutting device diagrammatically indicated at 11 for cutting the stripped strands into the desired small pieces. Device 11 includes a rotary knife 11a and a stationary counter knife 11b. The mounting of the stripping device and the cutting device directly on the mounting members has the advantage that the positioning of the two devices in reference to the respective roller 3 remains unchanged when the position of the two rollers relative to each other is changed as will be more fully described hereinafter. Separate drive means for the cutting devices may be provided, or the drive for these devices may be derived from the drive means for the rollers.

The upper ends 12 of the two mounting members are joined by a tensioning means. This means comprises a bolt 13 which is somewhat elastic in comparison with the rigidity of mounting members 5 and 6 and the base part of the frame structure 2. Bolt 13 is secured in position by nuts 13' or other suitable fastening means. A sleeve 14, a nut 15 and a counter nut 16 are interposed between the upper ends 12 of the mounting members. The sleeve 14, nut 15 and counter nut 16 constitute an adjustable abutment means which abuts against a rigid abutment member 17 which may be formed of two washers 17a and 17b as is shown.

The lower ends 7 of the mounting members abut against each other by means of inserts 19 and 20. The facing surfaces of the two inserts have preferably a bally configuration. Insert 20 is rigidly mounted in mounting member 6, but insert 19 is displaceably supported in mounting member 5 and biased toward insert 20 by a loaded spring 18.

In the illustrated position of the device, bearings 4 for journals 9 of the rollers 3 are not under load since the distance at which the upper ends 12 of the mounting members can approach each other by tightening nuts 13' of bolt 13 can be suitably limited by the adjustment of sleeve 14 and nuts 15, 16 coacting with fixed abutment member 17. The substantially load-free condition of journals 9 in bearings 4 is also due to the fact that the play between the lower ends 7 of the mounting members and the base part of the frame structure 2 and also between pivot pins 8 and bearings 1 therefor is at least substantially eliminated by the pressure with which insert 19 is pressed against insert 20 by the action of spring 18.

Bearings 4 and the journals 9 of rollers 3 are subjected to a substantial load only when the plastic material to be worked up is fed to the rollers. Operational variations in this load is compensated by the comparatively high elasticity of bolt 13 in comparison with the rigidity of mounting members 5 and 6 and the base part of the frame structure 2.

The material to be worked is fed to the rollers from the top and is automatically pulled between the rollers.

When it is desired to clean the device, the bolts 13 are detached in an obvious manner and the two pairs of mounting members 5, 5' and 6, 6' which as previously mentioned are coupled with each other, can be swung outwardly by simply pivoting mounting members in bearings 1. After reassembly of the device, which is obvious from the figure and the previous description, all the components of the device are automatically restored to the original setting in reference to each other.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:
1. A device for granulating plastic material, said device comprising in combination:
  a pair of parallel rotary rollers each having in its periphery a plurality of circumferential axially spaced forming grooves;
  two support structures, one at each end of said rollers to support the same, each of said support structures including a stationary base part, a pair of mounting members, one for each roller, each of said mounting members having journaled therein the respective end of one of said rollers;
  a pair of bearing means on said base part, each of said bearing means pivotally supporting one of the mounting members at one end thereof with play, said mounting members having wall portions at said one end facing each other, at least one of said facing wall portions including a recess;
  an insert fitted in said recess displaceable toward the other facing wall portion;
  a spring fitted in said recess between the base thereof and said insert, said spring biasing the insert into abutment with said other facing wall portion and urging said one end of the mounting members apart from each other thereby taking up the play in said bearing means;
  an adjustable tensioning means secured to both said mounting members at the other end thereof, said tensioning means rigidly holding said mounting members in a pivotal position in reference to each other in which position the peripheral walls of said rollers abut against each other with a predetermined pressure, the grooves of each of said rollers constituting forming gaps for forming therein individual strands of the plastic material to be granulated and fed between the rollers from the side thereof opposite to said base part; and
  a stripping means for each roller mounted on the respective mounting member adjacent to the periphery thereof, each of said stripping means coacting with the respective roller to strip the strands being formed in said forming gaps.

2. A granulating device according to claim 1, wherein a means for cutting the stripped strands is also mounted on each of said mounting members.

3. A granulating device according to claim 1, wherein each of said mounting members comprises a generally jaw-shaped member partly encompassing the respective roller, the lower end of each of said jaw members being pivoted to the respective bearing means on said base part and the upper end having mounted thereon one end of said tensioning means.

4. A granulating device according to claim 1, wherein each of said tensioning means comprises a rigid abutment member abutting against one of said mounting members, and a counter member coacting with said abutment member and the other of said mounting members, said counter member being adjustable in reference to said abutment member for varying the abutment pressure between said rollers.

References Cited

UNITED STATES PATENTS

| 727,177 | 5/1903 | Montgomery | 241—232 |
| 2,140,511 | 7/1964 | Seufert et al. | 18—9 |

FOREIGN PATENTS

| 71,044 | 5/1952 | Netherlands. |
| 428,788 | 5/1935 | Great Britain. |

WILLIAM J. STEPHENSON, *Primary Examiner.*